United States Patent [19]

Gary

[11] Patent Number: 4,474,062

[45] Date of Patent: Oct. 2, 1984

[54] SYSTEM FOR INDICATING FUEL-EFFICIENT AIRCRAFT ALTITUDE

[75] Inventor: Bruce L. Gary, Pasadena, Calif.

[73] Assignee: The United States of America as represented by the Administrator of the National Aeronautics and Space Administration, Washington, D.C.

[21] Appl. No.: 412,039

[22] Filed: Aug. 26, 1982

Related U.S. Application Data

[63] Continuation-in-part of Ser. No. 224,231, Jan. 12, 1981, Pat. No. 4,346,595.

[51] Int. Cl.$^3$ ............................................. G01C 21/00
[52] U.S. Cl. .................................................. 73/178 R
[58] Field of Search ............ 73/178 R, 178 H, 178 T, 73/112

[56] References Cited

U.S. PATENT DOCUMENTS 3,722,272 3/1973 McPherson ...................... 73/178 R
4,346,595 8/1982 Frosch et al. ..................... 73/178 R Primary Examiner—Donald O. Woodiel
Attorney, Agent, or Firm—Paul F. McCaul; John R. Manning; Thomas H. Jones

[57] ABSTRACT

A method and apparatus are provided for indicating the altitude at which an aircraft should fly so the W/d ratio (weight of the aircraft divided by the density of air) more closely approaches the optimum W/d for the aircraft. A passive microwave radiometer on the aircraft is directed at different angles with respect to the horizon, to determine the air temperature and therefore the density of the air, at different altitudes. The weight of the aircraft is known. The altitude of the aircraft is changed to fly the aircraft at an altitude at which is W/d ratio more closely approaches the optimum W/d ratio for that aircraft.

4 Claims, 7 Drawing Figures

SYSTEM FOR INDICATING FUEL-EFFICIENT AIRCRAFT ALTITUDE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS-REFERENCE

This is a continuation-in-part of U.S. Patent Application Ser. No. 224,231 filed Jan. 12, 1981, now U.S. Pat. No. 4,346,595.

BACKGROUND OF THE INVENTION

The fuel consumption or efficiency of an aircraft depends upon several factors that are related to the altitude at which it is flown. One factor is the density of the air, which varies with both the altitude and temperature of the air. Each large aircraft has an optimum weight-to-air density ratio, often referred to as the W/d ratio, at which there is minimal fuel consumption per ground-track mile. An aircraft may initially climb to a permissible altitude such as 35,000 feet, at which the expected air density will result in a W/d ratio close to optimum. When the aircraft looses sufficient fuel and weight, that another permissible altitude will produce a W/d ratio closer to optimum, the aircraft then increases altitude to the next permissible level. (Of course, other factors such as wind speed are also taken into account in determining at what altitude the aircraft will fly).

The actual density of air at any given altitude depends considerably upon the temperature of the air. If the actual air temperature at other altitudes were known, such as at the next higher permissible altitude of an aircraft, then it would be possible to change the aircraft altitude to always fly the aircraft at a permissible altitude which provides a W/d ratio closest to optimum.

SUMMARY OF THE INVENTION

In accordance with the present invention, a method and apparatus are provided which enable the determination of the air density at altitudes adjacent to that of an aircraft, to indicate the altitude at which an aircraft should be flown to achieve a W/d ratio closer to the optimum ratio for that aircraft. The method includes directing a radiometer on the aircraft at an angle from the horizontal, and measuring the intensity of microwave radiation near a predetermined frequency. The intensity of the radiation and the angle of the radiometer, indicate the temperature of the air at a particular altitude relative to the aircraft, and the temperature is used to determined the density of the air at that altitude. Since the weight of the aircraft at any given time is known, the W/d ratio at any particular altitude can be determined. During flight, the altitude of the aircraft is changed to fly it at a next altitude at which the W/d ratio, based upon the density indicated by the radiometer measurement, is closer to optimum than at its present altitude.

The novel features of the invention are set forth with particularity in the appended claims. The invention will best be understood from the following description when read in conjunction with the accompanying drawings.

DESCRIPTION OF THE PREFERRED EMBODIMENTS

Figure 2:
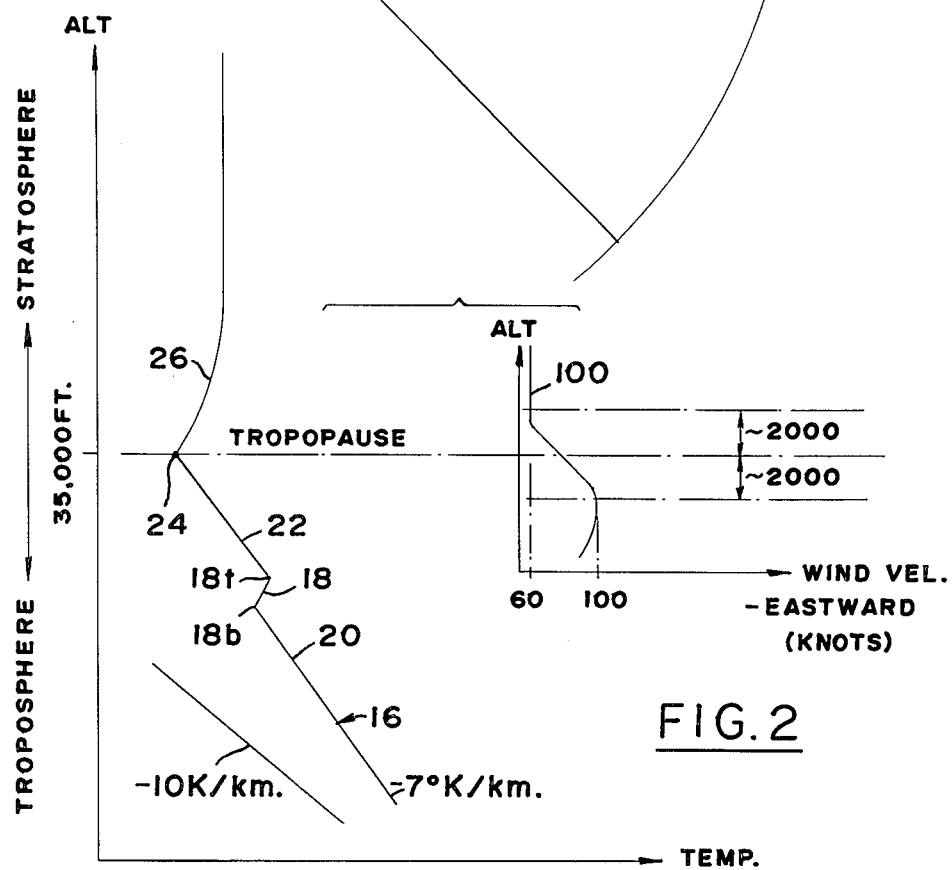
FIG. 2 displays graphs showing an altitude-temperature profile, and showing variation in wind speed with altitude, near the altitude of the tropopause.

FIG. 2 contains a graph 16 illustrating the relationship between altitude and the temperature of the air, at a height near that at which jet airliners typically operate. The temperature of the air typically changes with altitude at a rate of about $-7°$ Kelvin per kilometer, although this varies with and with the maximum rate that has been observed being about $-10°$ K/km. The location of the tropopause is indicated at 24, this being the altitude at which the top of the troposphere interfaces with the bottom of the stratosphere, and which typically occurs at an altitude of about 35,000 feet, although the height does vary (e.g. 30,000 to 60,000 feet). At the graph portion 26 immediately above the tropopause, the air temperature typically increases with altitude for several thousand feet and then remains substantially constant at higher altitudes. For the example illustrated, the region immediately above the tropopause has a temperature inversion wherein air temperature that has been decreasing begins increasing with altitude. The graph 16 also represents the phenomenon of a temperature inversion at 18 within the troposphere, at which the temperature-altitude slope suddenly changes between the points 18b and 18t. Measurement of the temperature can be useful in detecting the altitude of the troposphere in the region near an aircraft, since the wind velocity changes considerably in this region. FIG. 2 also includes a graph 100 showing an example of variation of wind velocity with altitude near the tropopause. An aircraft flying in an eastwardly direction may wish to fly about 2,000 feet below the tropopause where the velocity is greatest. An aircraft flying westward may want to fly at least about 2,000 feet above the tropopause or much more than 2,000 feet below it to encounter a minimal headwind.

Knowledge about the temperature of the air at locations several thousand feet above or below an aircraft can also be useful in promoting fuel efficiency, by operating an aircraft at an altitude where its W/d ratio will be close to the optimum ratio for that aircraft. In the term W/d ratio, W represents the gross weight of an aircraft at any given time and d represents the density of the air in which the aircraft is flying. In particular, d represents the ratio between the density of the air in which the aircraft is flying divided by the density of air at sea level and at a standard temperature and pressure (288° K. and 1313 milibars). As an example, an aircraft such as a Boeing 727 may have an optimum W/d ratio of $0.42 \times 10^6$ pounds and a gross take off weight of 149,000 pound. At 35,000 feet, the density d of air may be 0.354, so the W/d ratio is then very close to the optimum. As the aircraft travels and uses up fuel, its weight decreases so that it should be flown in air of lesser density to maintain a W/d ratio close to optimum.

The density of air varies according to the particular altitude, and the particular temperature existing at that altitude, at any given time. A flight engineer can measure the temperature of the air in which the aircraft is flying. Using an assumption that temperature decreases about 6 or 7 degrees C. per kilometer, and using air density variations given in a table for a standard atmosphere, he may calculate the air density at another level such as 4,000 feet higher. However, if the aircraft is actually flying at the tropopuase, then the actual air temperature at an altitude 4,000 feet higher may be 8° to 12° C. warmer than assumed. The air would be about 4 or 5% less dense than calculated. As a result, the actual rate of fuel consumption at the higher altitude may be about 3% greater than assumed. Mistakes of this type could be avoided if the actual local altitude-temperature profile were available to the flight engineer.

The measurement of air temperature at an altitude different from that of the aircraft can be accomplished by the use of a microwave radiometer on the aircraft. The radiometer is tuned to a frequency which enables it to sense temperature at a weighted average range on the order of 3 kilometers, and the viewing direction of the radiometer is scanned in elevation angle. Oxygen molecules in the atmosphere interact strongly with electromagnetic radiation at about 60 gegahertz ($60 \times 10^9$ Hz), and as a result produce thermal emission radiation at about this frequency. The amount of radiation from oxygen molecules which survives absorption at a particular distance from the emission, varies greatly with moderate changes in frequency. For example, at 60 GHz only about 4% of oxygen emission survive at a distance of about 1 kilometer at sea level, while at 56 GHz about 20% survives. When a radiometer which is detecting oxygen emission of a limited frequency band, such as within about 0.2 GHz of a center frequency such as 55.3 GHz, is directed at the atmosphere, it responds to emission from both distant and close molecules, but responds to emission at a weighted-average distance of about 3 kilometers when utilized at an altitude of about 30,000 feet. The actual response to emission from molecules decreases with distance exponentially and this is referred to as a weighting function.

Figure 3A:
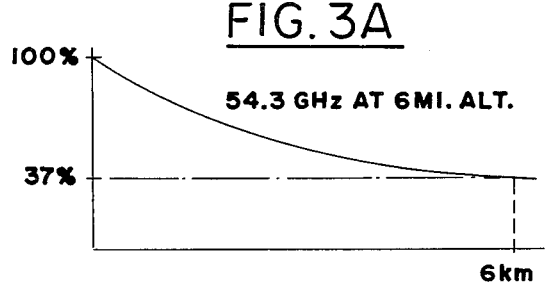
FIGS. 3A–3C illustrate how the "average" range of temperature detection varies with the frequency of the detected microwaves.
Figure 3B:
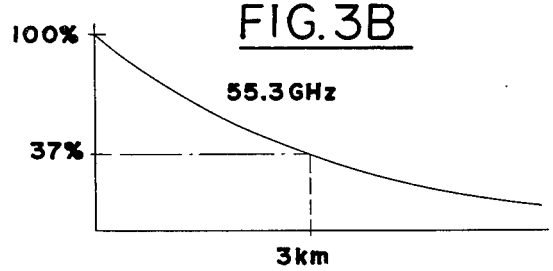

FIG. 3B shows how the proportion of emission from oxygen molecules decreases with distance for emissions at a microwave frequency of 55.3 GHz and an altitude of about 30,000 feet (about six miles), the figure representing the weighting function for the emission. At a distance of about 3 kilometers the detected radiation at this frequency is about 37% of the emitted radition. The 37% level represents 1/e (where e is the base of the natural logarithm system). About 37% of the detected radiation is at a greater distance than 3 km, and the other 63% originates from less than a 3 km distance. Although other averages can be utilized, the weighted-average distance (beyond which 37% of the emissions of that distance are detected) is the range which is most representative of the measured temperature. Where air temperature changes linearly with distance, for example, the measured temperature is the temperature at the weighted average distance.

Figure 3C:
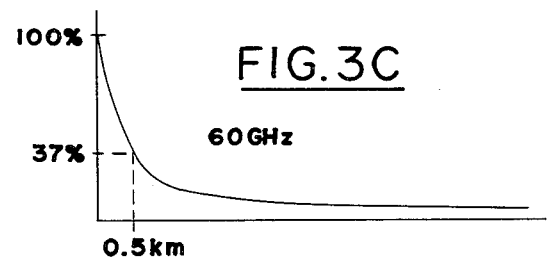

FIG. 3A shows the weighting function for oxygen molecules emission in the atmosphere at 54.3 GHz and 30,000 feet altitude, showing that the 1/e or 37% level is at about 6 km. Similarly, FIG. 3C shows that at 60 GHz and the same 30,000 foot altitude, the 37% level is at a range of about 0.5 km. Thus, as microwave frequencies lower than 54 GHz are utilized to detect oxygen emissions, emission from greater distances are detected. However, the altitude resolution at which a particular temperature feature exists is much poorer when a frequency lower than 54 GHz (or higher than 66 GHz) is utilized. A range of about 3 km, obtained by the use of a frequency of about 55.3 GHz (or about 65 GHz) at an altitude of about 30,000 feet, is great enough to detect temperature inversions close enough to the altitude of the aircraft to be of interest in minimizing fuel consumption. This range of about 3 km is also small enough to provide considerable resolution to determine the approximate height at which temperature changes occur, and thereby enable the altitude location of the top and bottom of an inversion layer and the rate of air temperature change with altitude within the layer.

Figure 1:
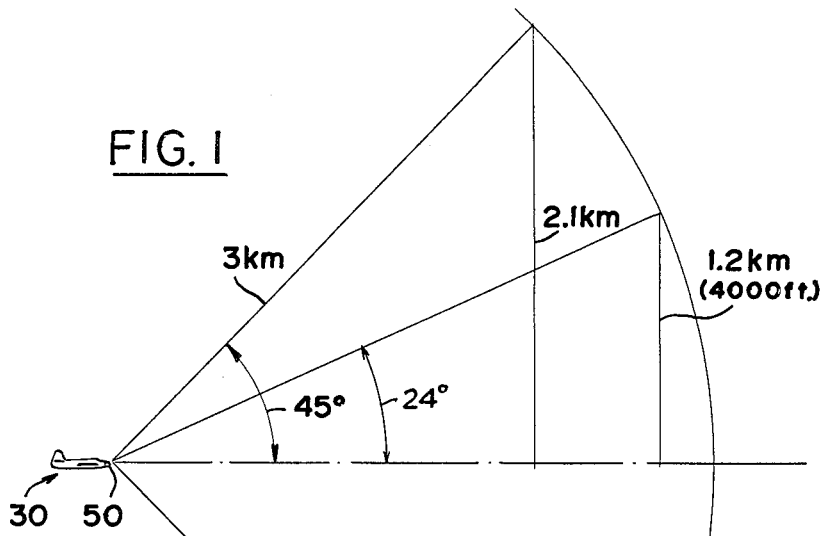
FIG. 1 is a side elevation view indicating the method of operation of the system of the present invention.

FIG. 1 illustrates the manner in which a radiometer on the aircraft 30 can be utilized to measure air temperature at an altitude other than that of an aircraft. The radiometer, indicated at 50, is a well known type of microwave radiometer which includes a horn for receiving radiation and a waveguide connected to the throat of the horn antenna to carry microwaves of less than a certain wavelength to a mixer-amplifier and other processing circuitry. The horn is mounted so it can be rotated about a horizontal axis to scan within a wide range of elevation angles, such as between −45° and +45° with respect to the horizontal when the aircraft is flying horizontally. The radiometer circuitry is operated to measure radiation of a limited bandwidth about a predetermined frequency such as 55.3 GHz, which results in the radiometer measuring the air temperature at a weighted average distance of about 3 kilometers. When the radiometer is directed at a +45° elevation angle, it measures the air temperature at an altitude of 3 kilometers times sine 45°, or in other words at an elevation of 2.1 km above the altitude of the aircraft (and at a point which is at a horizontal distance of 2.1 km, although this is of no importance herein). When the radiometer is directed at 24°, it measures the air temperature at an altitude of 1.2 km, or about 4000 feet above the aircraft altitude. Thus, by directing the radiometer at a particular elevation angle with respect to the horizontal, and measuring the radiation received at a particular frequency, the apparatus of the present invention is able to provide an estimate of the temperature of the air at a corresponding elevation distance or altitude above (or below) the aircraft. Using tables, the density of the air at a particular altitude and temperature can be determined.

Figure 4:
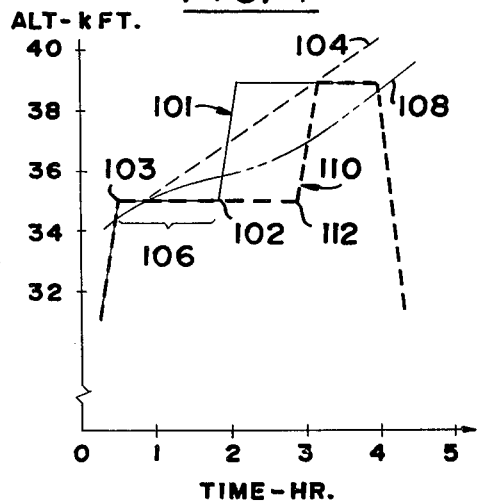
FIG. 4 is a graph showing how the altitude of an aircraft can be changed during a flight to increase its fuel efficiency.

FIG. 4 contains a graph 101 that represents the variation of the altitude of an aircraft with time during a flight of 4½ hours, based upon standard data about pressure variation with altitude. In flying along a path indicated by graph 101, the aircraft initially climbs to a level such as 35,000 feet, at point 103, which is one of the Westward flying levels allowed by the FAA (Federal Aviation Administration). As the aircraft uses up fuel and therefore looses weight, it is desirable to increase the altitude of the aircraft to maintain its W/d ratio close to optimum. Thus, at the point 102, the aircraft climbs to a next higher permissible altitude such as 39,000 feet. Finally, the aircraft must descend to land. The graph 104 represents the optimum altitude of the aircraft at any given time, based on the assumption that the air density decreases at a particular typical rate, based upon typical variations of air temperature with altitude such as a decrease of −7° C. per kilometer. It can be seen that along the section 106 of the graph 100, the aircraft is being flown at a permissible altitude which is closest to the optimum altitude indicated by the graph 104. At the point 102, the flight engineer could see that the optimum altitude becomes closer to the next higher permissible altitude of 39,000 feet, so that the aircraft climbs to that altitude.

The graph 108 represents the optimum variation of altitude of the aircraft with time, based upon one example of variation of air density with altitudes along the flight path of the aircraft. The difference between the actual optimum altitude indicated by graph 108 and the standard optimum path indicated by graph 104, is due to the temperature of the air not changing with altitude as assumed. This is especially true when the aircraft is flying a small distance below the tropopause. If instruments in the aircraft could determine the actual air temperature at levels above the aircraft, then the actual optimum flight altitude indicated by graph 108 could be determined. In that case, the aircraft could fly along the path 110, wherein it remained at the 35,000 foot level until the point 112, when the flight engineer would note that only at that time would the W/d ratio be closer to optimum at the next higher permissible altitude.

Figure 5:
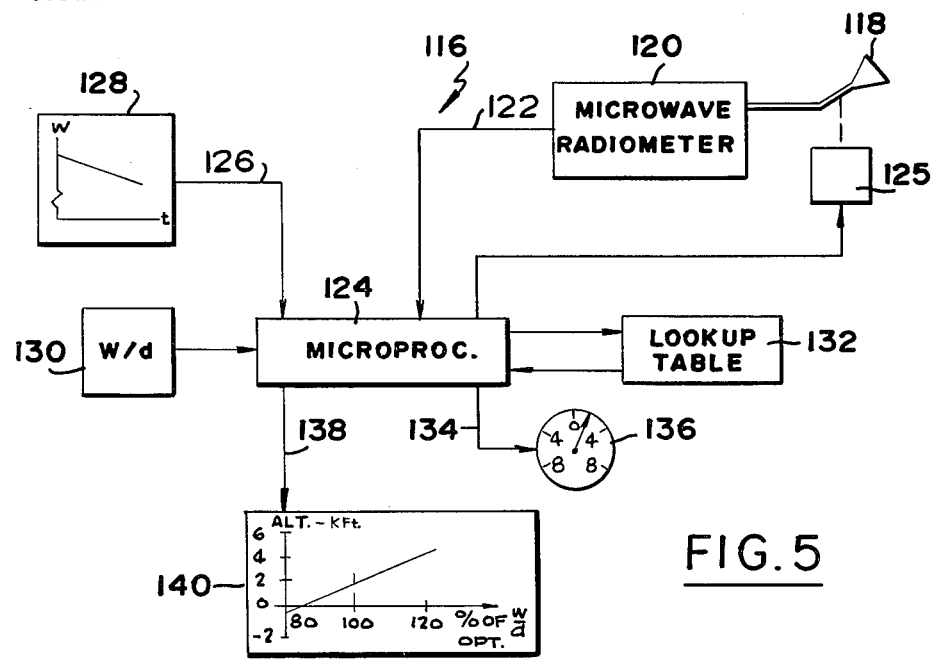
FIG. 5 is a block diagram of a system for indicating the optimal altitude of an aircraft.

FIG. 5 illustrates an instrument 116 that can be installed in an aircraft to indicate the altitude at which the W/d ratio would be closest to the optimum for that aircraft. The system includes a horn antenna radiometer 118 whose output is delivered through a waveguide to a microwave radiometer 120. In the radiometer 120, the microwave signals are filtered and a DC voltage is delivered on an output line 122 whose amplitude is proportional to the amplitude of the microwave radiation detected by the antenna 118 at a particular frequency such as about 55.3 GHz. In one example, the microwave radiation within a bandwidth of 50 to 220 mHz, above and below the 55.3 GHz frequency is sensed, and the output is proportional to the amplitude within this bandwidth, with background noise being taken into consideration. The line 122 is connected to a microprocessor 124 which has several inputs. The angle of the horn is controlled by a device 125. A signal on line 126 from a circuit 128, which indicates the weight profile, or weight of the aircraft at any given time, based upon the initial weight at take-off minus the weight of fuel expended, is delivered to the microprocessor. A circuit 130 delivers a signal representing the optimal W/d ratio of the aircraft, which is a constant, and a lookup table 132 delivers signals indicating the density of air at any altitude for a given temperature. Of course, the functions of most of these circuits can be part of a single computer. The density of the air at any given altitude can be determined by aiming the radiometer 118 at an angle whose sine times 3 kilometers equals the desired difference in altitude. Since the actual air density at several different altitudes in the vicinity of the aircraft can be determined and the weight of the aircraft is known, the microprocessor can indicate on its output line 134, the increase (or decrease) in altitude that is required to fly the plane at its optimum W/d ratio. Such increase can, for example, be indicated by a meter 136.

The microprocessor has another output line 138 which carries signals representing the W/d ratio at the particular altitude represented by the elevation angle of the microwave horn. These signals drive a CRT display 140 to indicate the percent of the optimum W/d ratio, that would be achieved at various altitudes relative to the aircraft.

At present, the FAA permits airliners to operate at only specific altitudes spaced 4,000 feet apart for a given heading. There are proposals to increase the permissible levels to levels that are spaced 2,000 feet apart. A flight engineer could view the meter 136 to determine when he could fly the plane closer to the optimum W/d ratio by ascending to the next permissible flight level. Of course, a wide variety of display formats can be provided, including a display on a cathode ray tube of the W/d ratio at different altitudes. In making his decision, the engineer will take other factors into consideration, including expected wind speed at a next permissible flight level.

Thus, the invention provides a method and apparatus for operating an aircraft more efficiently by operating it at a flight level closer to the optimum W/d ratio of the aircraft. This can be accomplished by directing a radiometer on the aircraft at an angle from the horizontal to measure the intensity of microwave radiation, to thereby generate a signal representing the density of air at a different elevation. The altitude of the aircraft can be changed to fly it at another altitude at which the W/d ratio will more closely approach the optimum W/d ratio of the aircraft.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for more efficiently operating an aircraft which operates most efficiently at a particular optimum W/d ratio, where W represents aircraft weight and d represents air density, when said aircraft is initially flying at a predetermined altitude and its weight profile is known, comprising:

directing a radiometer on said aircraft at an angle from the horizontal, measuring the intensity of microwave radiation near a predetermined frequency when the radiometer is at said angle and generating a signal representing the density of air at an altitude different from that of the aircraft based upon the angle of the radiometer and the intensity of the radiation it measures;

generating an indication of the weight W of the aircraft; and changing the altitude of the aircraft to fly it at another altitude at which the weight of the aircraft divided by the density of air at said next altitude, more closely approaches the optimum W/d ratio for the aircraft.

2. A method for determining the ratio W/d representing the weight W of an aircraft divided by the density d of air outside the aircraft, if the aircraft is flown at a particular altitude which is different from its present one, comprising:

viewing the atmosphere along a viewing direction that is at an elevation angled from the horizontal, detecting those microwaves that lie within a limited frequency band along said viewing direction, and generating a first signal representing the density d of air at a particular altitude which lies along said viewing direction in accordance with the intensity of microwaves of said frequency detected at said viewing direction;

generating a second signal representing the present weight W of the aircraft; and generating a third signal representing the W/d ratio of the aircraft at said particular altitude, based on said first and second signals and the elevation angle of said viewing direction.

3. Apparatus for installation in an aircraft having a predetermined optimum W/d ratio, where W is weight of the aircraft and d is density of the air surrounding the aircraft, and where the weight of the aircraft at any given time is known, comprising:

a microwave radiometer apparatus, including a directional microwave horn that can receive microwaves along a viewing direction that is angled from the horizontal, and a radiometer circuit for generating a signal representing the density d of air at an altitude that lies along said viewing direction in accordance with the amplitude of microwaves of a limited bandwidth received by the directional horn;

means for mounting said radiometer apparatus in an aircraft so the radiometer can sense microwaves at selected angular elevations; and means responsive to the output of said radiometer circuit, to the angular elevation of said radiometer, and to the weight of the aircraft, for indicating an optimum altitude at which the aircraft should fly to more closely approach the optimum W/d ratio of the aircraft.

4. Apparatus for determining the W/d ratio of an aircraft if flown at a predetermined different altitude than its present altitude, where W is the weight of the aircraft and d is the density of air at said predetermined different altitude, comprising:

means for viewing the atmosphere along a viewing direction that is at an elevation angle from the horizontal, for detecting microwaves that lie within a limited frequency band along said viewing direction, and for generating information representing density d of air at an altitude that lies along the viewing direction in accordance with the intensity of microwaves of said frequency band at said viewing direction;

means for generating information representing the present weight W of the aircraft; and means responsive to said information representing the density d based upon the intensity of microwaves, the elevation angle of said viewing direction, and said information representing the present weight of the aircraft, for generating a signal representing the W/d ratio of the aircraft at a particular altitude.

* * * * *